Figures 1, 2:
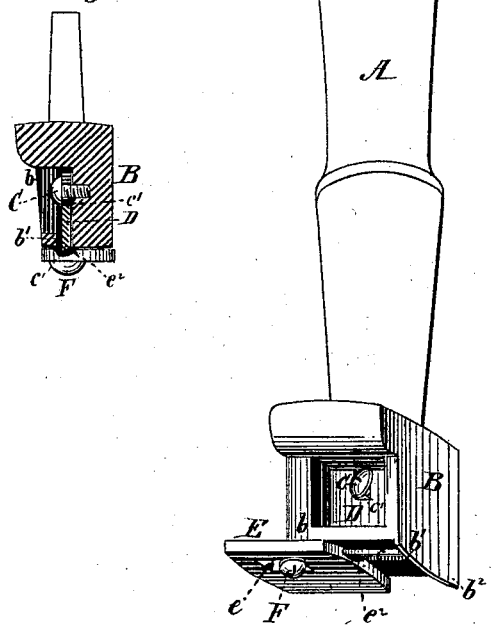

J. R. REED.
Tools for Squaring the Edges of Boot and Shoe Soles

No. 148,243.  Patented March 3, 1874.

Witnesses:
G. Mathys.
Solon C. Kemon

Inventor:
Joshua R. Reed
Per Lewis & Co.
Attorneys.

UNITED STATES PATENT OFFICE.

JOSHUA R. REED, OF BALTIMORE, MARYLAND, ASSIGNOR TO HIMSELF AND EDWARD KEARNEY, OF SAME PLACE.

IMPROVEMENT IN TOOLS FOR SQUARING THE EDGES OF BOOT AND SHOE SOLES.

Specification forming part of Letters Patent No. 148,243, dated March 3, 1874; application filed December 26, 1873.

*To all whom it may concern:*

Be it known that I, JOSHUA R. REED, of Baltimore city, State of Maryland, have invented a new and Improved Tool for Squaring the Edge of Boot and Shoe Soles; and I do hereby declare that the following is a full, clear, and exact description of the same, reference being had to the accompanying drawing forming a part of this specification, in which—

Figure 1 is a perspective view of the entire tool; Fig. 2, a longitudinal section of the socket, showing also its shank.

The invention consists in constructing a squaring-tool socket with a solid lip and peculiar apertures, so as to make a cheaper and more durable tool.

The invention will first be described, and then pointed out in the claim.

A represents a handle, having a socket, B, attached thereto in any suitable manner. This socket has a rectangular aperture, $b$, on one side, and a narrow slot, $b^1$, at the end. At the bottom of this slot $b^1$, and under the rectangular opening $b^1$, is placed an adjustable clamp-screw, C. D is a planer-knife, having the cutting-edge $c$, and directly opposite thereto the rearwardly-open slot $c'$. The cutter D is inserted through slot $b^1$, so as to bring the tool astraddle the clamp-screw C, and under its head. Of course, as the cutter wears, it may be gradually advanced and clamped at any suitable degree of projection. E is a gage, which is adjustable in the line of the cutting-edge of knife by means of a slot, $e$, and a clamp-screw, F, thus being carried to or from the lip or flange $b^2$, that is formed opposite thereto and upon the socket B. It also has a subjacent groove, $e^2$, that fits over the knife-edge, to avoid the contact of gage therewith. After the layers of leather which constitute the sole of a boot or shoe have been consolidated, the edges are uneven and require to be pared and scraped until a certain degree of smoothness is obtained before they are blackened.

In order to effect this object with my tool, the operation is as follows: The tool is placed with the planer-cutter across the edge of sole, and with the lip $b^2$ next to the upper, the gage being then adjusted to the thickness of sole. This is necessary, to prevent cutting or injuring the upper. The edge-surface of sole is then smoothed all around it very quickly and in a most workmanlike manner.

Having thus described my invention, what I claim as new, and desire to secure by Letters Patent, is—

The socket B, with solid lip $b^2$ and apertures $b$ $b^1$, arranged as described, and the plane D, having a straight vertical adjustment, in the manner set forth.

JOSHUA R. REED.

Witnesses:
WM. A. DORSEY,
THOS. PATTISON.